US008290290B2

(12) United States Patent
Chien et al.

(10) Patent No.: US 8,290,290 B2
(45) Date of Patent: Oct. 16, 2012

(54) CONTROL IC FOR COLOR SEQUENTIAL LIQUID CRYSTAL DISPLAY

(75) Inventors: Chin-Wei Chien, Taipei (TW); Ting-Long Kuo, Taipei (TW); Kai-Yi Wu, Taipei (TW); Chung-Yao Hu, Banciao (TW); Hong-Zhung Zhu, Taichung (TW); Chih-Yu Lin, Tanzih Township, Taichung County (TW); Chao-Chu Chang, Hukou Township, Hsinchu County (TW); Chia-Jung Lin, Taichung (TW); Lung-Hui Wang, Shengang Township, Taichung County (TW)

(73) Assignee: Sitronix Technology Corp., Jhupei (TW)

( * ) Notice: Subject to any disclaimer, the term of this patent is extended or adjusted under 35 U.S.C. 154(b) by 1031 days.

(21) Appl. No.: 12/254,050

(22) Filed: Oct. 20, 2008

(65) Prior Publication Data

US 2010/0039362 A1 Feb. 18, 2010

(30) Foreign Application Priority Data

Aug. 13, 2008 (TW) ................................ 97130867 A

(51) Int. Cl.
*G06K 9/40* (2006.01)

(52) U.S. Cl. ........................................ 382/254; 348/761

(58) Field of Classification Search .................. 382/162, 382/254; 348/751, 761, 791; 349/8, 78, 349/80, 108; 345/38, 50, 51, 87, 88
See application file for complete search history.

(56) References Cited

U.S. PATENT DOCUMENTS 5,307,055 A * 4/1994 Baskin et al. .................. 345/2.2
5,841,648 A * 11/1998 Mansfield ........................ 363/59
6,346,936 B2 * 2/2002 Murayama et al. ........... 345/208
7,586,485 B2 * 9/2009 Teshirogi et al. ............. 345/204
7,602,360 B2 * 10/2009 Park ................................ 345/89
7,893,915 B2 * 2/2011 Woo et al. ..................... 345/102
2002/0036636 A1 * 3/2002 Yanagi et al. ................. 345/211
2003/0010894 A1 * 1/2003 Yoshihara et al. ......... 250/208.1
2004/0080521 A1 * 4/2004 Nose et al. .................... 345/690
2005/0083280 A1 * 4/2005 Hiraki et al. ..................... 345/87
2005/0200295 A1 * 9/2005 Lim et al. ...................... 315/150
2005/0212916 A1 * 9/2005 Nakamura et al. ....... 348/207.99
2005/0248322 A1 * 11/2005 Kagemoto et al. ............ 323/220
2006/0125715 A1 * 6/2006 Choi ............................... 345/14
2007/0013626 A1 * 1/2007 Ando et al. ...................... 345/88
2007/0211014 A1 * 9/2007 Kim et al. ..................... 345/102
2007/0236243 A1 * 10/2007 Park et al. ..................... 324/770
2008/0094128 A1 * 4/2008 Ito et al. ........................ 327/536
2008/0150859 A1 * 6/2008 Song et al. ....................... 345/87
2008/0158138 A1 * 7/2008 Yamazaki et al. ............ 345/102
2008/0224973 A1 * 9/2008 Louwsma ........................ 345/88
* cited by examiner

*Primary Examiner* — Jason M Repko
*Assistant Examiner* — Shervin Nakhjavan
(74) *Attorney, Agent, or Firm* — Ming Chow; Sinorica, LLC

(57) ABSTRACT

A control IC (integrated circuit) for color sequential liquid crystal displays (LCD) is revealed. The control IC includes an interface for receiving a command and at least one display data and a timing generator to generate a scan timing signal, a data timing signal, and a driving timing signal. According to the scan timing signal, a scan driving circuit generates a scan signal that is sent to the color sequential LCD. In accordance with the data timing signal, a data driving circuit receives the display data for generating a data signal sent to the color sequential LCD. According to the driving timing signal, a light-source driving circuit generates a plurality of driving signals sent to the color sequential LCD so as to generate a plurality of color backlights. In accordance with the scan signal, the data signal and the plurality of backlights, the color sequential LCD displays a frame.

24 Claims, 3 Drawing Sheets

CONTROL IC FOR COLOR SEQUENTIAL LIQUID CRYSTAL DISPLAY

BACKGROUND OF THE INVENTION

1. Field of Invention

The present invention relates to a control integrated circuit (IC), especially to a control IC for color sequential liquid crystal displays.

2. Description of Related Art

Nowadays due to advanced technology, various new information products are developed and promoted to meet people's requirements. The conventional display device has shortages of large volume, high power consumption and high radiation dose while the liquid crystal display (LCD) features on compact volume, light weight, low radiation dose and low power consumption. Thus the conventional display device is replaced with the LCD which has become a main stream of a current display market. However, the conventional LCD uses color filters for converting light beams into three color light beams-red, green and blue since there are three primary colors required for each pixel. To create a color image, there are three subpixels in each pixel-red, green and blue, respectively corresponding to red, green and blue color filters. Due to persistence of vision, the human eye receives red, green and blue light through the color filters and perceives pixel color. The light transmission of the LCD and single pixel (dot) size are limited by the color filter. Thus display quality of the LCD is affected by the color filter.

In order to solve the above mentioned problem, a color sequential LCD has been developed. In the color sequential display, three primary colors of each pixel are displayed sequentially. A frame is decomposed into red, green, and blue fields displayed in successively. The three fields are illuminated by the red, green, and blue backlight accordingly. Relying on the human vision system, the successive images are fused into a color image. Thus the sequential display includes no color filter. Moreover, in contrast to pixel size of the LCD with color filter, the pixel size of the sequential display is smaller. Therefore, the color sequential display has higher resolution with lower cost.

Refer to FIG. 1, a block diagram of control circuit of a conventional color sequential display is disclosed. The control circuit of the conventional color sequential display consists of a light-source driving circuit 10, a data driving circuit 12, a scan driving circuit 14 and a microcontroller 16. The light-source driving circuit 10 generates a plurality of driving signals that are sent to a backlight module 22 of a display panel 20 so as to generate a plurality of color backlights. The data driving circuit 12 and the scan driving circuit 14 respectively generate a data signal and a scan signal that are sent to a display module 24 of the display panel 20. According to the data signal, the scan signal and the plurality of backlight colors, a frame is shown.

The microprocessor 16 generates corresponding time signals according to the frames intended to be displayed and the time signals are sent to the light-source driving circuit 10 and the scan driving circuit 14 for timing control of the generated scan signals and driving signals. And the display data is sent to the data driving circuit 12. Generally, the microprocessor 16 needs to control timing of the scan data from the scan driving circuit 14 matching timing of the drive signal from the light-source driving circuit 10 so as to make timing of the scan signal matches timing of the backlight module generating the color backlights. Yet the microprocessor 16 is not only for control of the color sequential display, it also used for control of electronics disposed with itself such as handhold game consoles, and digital photo frames. This means the microprocessor 16 needs to execute commands and launch applications of the electronics. Due to heavy of the microprocessor 16, the electronics are unable to run smoothly. Moreover, the microprocessor 16 generates clock signals through program operation or calculation of an internal counter so that timing of the light-source driving circuit 10 and timing of the scan driving circuit 14 are unable to be precisely controlled and matched with each other. Thus the scan signals generated by the scan driving circuit 14 are also unable to match the color backlights generated by the backlight module 22 precisely. Therefore, quality of the frame displayed on the display panel 20 is under the influence.

Furthermore, the microprocessor 16 requires additional several pins such as GPIO pins for timing control of the light-source driving circuit 10 and the scan driving circuit 14 so as to make them match each other. Thus the number of pins of the microprocessor 16 is increased and the occupied are also increased so that the cost is raised. The volume of the electronic is highly related to the area of the whole control circuit occupied. Thus the compact volume and light weighted requirements of the device are unable to be achieved. In addition, an external Power IC 18 is used as a high-voltage power supply to provide power to the light-source driving circuit 10, the data driving circuit 12, and the scan driving circuit 14. This also leads to increasing of the cost.

Thus there is a need to provide a control IC for the color sequential LCD that overcomes shortcomings of conventional color sequential LCD such as overloading of the microprocessor and large occupied area and enables the scan driving circuit to match the light-source driving circuit precisely for solving the problems mentioned above.

SUMMARY OF THE INVENTION

Therefore it is a primary object of the present invention to provide a control IC for color sequential liquid crystal displays that includes a timing generator for precise control of timing of the scan driver circuit, timing of the data driving circuit and timing of the light-source driving circuit and matching with one another so as to improve display quality of the color sequential LCD.

It is another object of the present invention to provide a control IC for color sequential liquid crystal displays that reduces loading on the microprocessor so as to make the microprocessor run and launch applications of the electronics with the color sequential LCD smoothly.

It is a further object of the present invention to provide a control IC for color sequential liquid crystal displays that reduces number of pins of the microprocessor for reducing cost and occupied area.

It is a further object of the present invention to provide a control IC for color sequential liquid crystal displays that integrates a power supply circuit for reducing cost.

In order to achieve above objects, a control IC for color sequential liquid crystal displays of the present invention includes an interface, a timing generator, a data driving circuit and a scan driver circuit. The interface is coupled to a microprocessor, and the interface receives a command and at least one display data of the microprocessor therefore. The timing generator generates a driving timing signal, a data timing signal and a scan timing signal, respectively corresponding to the light-source driver circuit, the data driving circuit and the scan driving circuit according to the received command. Then the light-source driving circuit generates a plurality of driving signals according to the driving timing signal, the data driving circuit receives the display data for generating a data signal according to the data timing signal, and the scan driving circuit generates a scan signal according to the scan timing signal. Those driving signals are used to control the color sequential LCD for generating a plurality of color backlights. In accordance with the data signal, the scan signal, and the color backlights, the color sequential LCD shows a frame. Moreover, besides the light-source driver circuit, a power supply circuit is further integrated into the control IC so that there is no need to use an external IC for reducing cost.

BRIEF DESCRIPTION OF THE DRAWINGS

The structure and the technical means adopted by the present invention to achieve the above and other objects can be best understood by referring to the following detailed descriptions of the preferred embodiments and the accompanying drawings, wherein.

DETAILED DESCRIPTION OF THE PREFERRED EMBODIMENT

Figure 1:
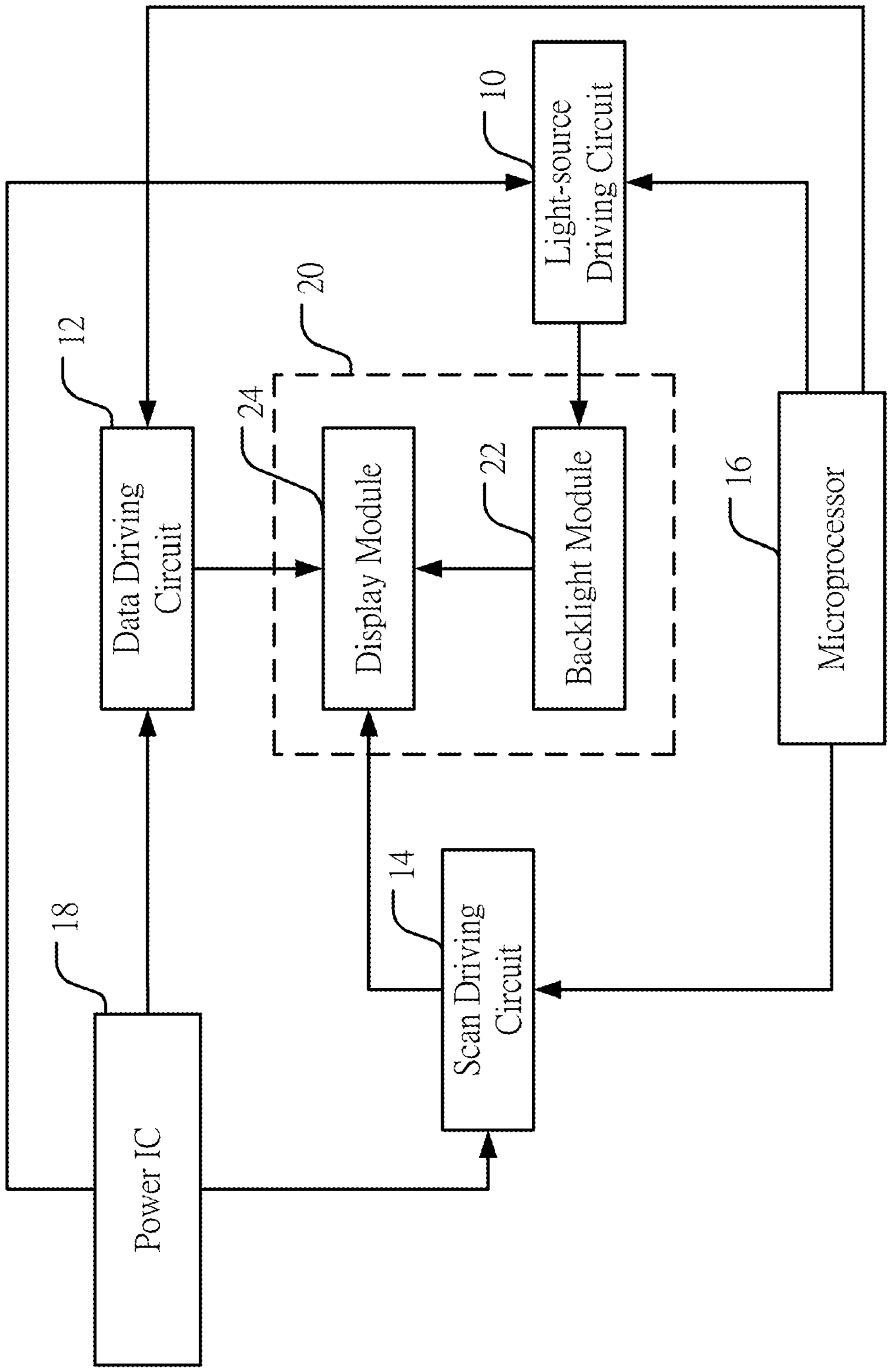
Fig. 1(prior art)
FIG. 1 is a block diagram of control circuit of a conventional color sequential liquid crystal display.
Figure 2:
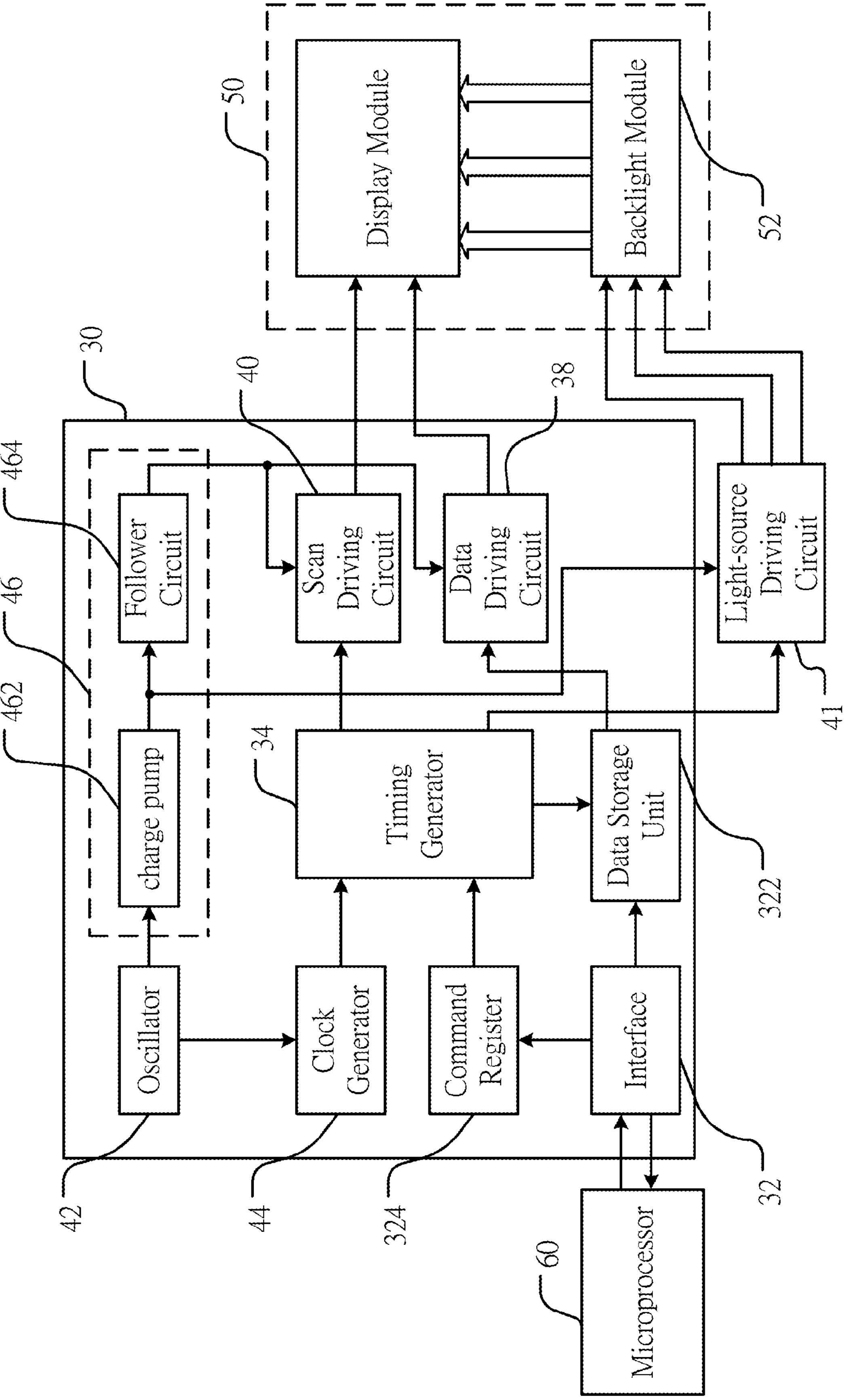
FIG. 2 is a block diagram of an embodiment of a control IC according to the present invention.

Refer to FIG. 2, a block diagram of an embodiment of a control IC is revealed. The control IC is applied to a Twisted Nematic LCD (TN LCD), a Super Twisted Nematic LCD (STN LCD), or other LCDs. The control IC 30 of the present invention includes an interface 32, a timing generator 34, a data driving circuit 38 and a scan driving circuit 40. The circuit of the color sequential LCD further includes a light-source driving circuit 41. The color sequential LCD consists of a display panel 50 formed by a backlight module 52 and a display module 54.

The interface 32 is coupled to a microprocessor 60 for receiving a command and at least one display data. According to frames intended to be displayed on the color sequential LCD, the microprocessor 60 sends corresponding commands and display data. The interface 32 is further coupled to a data storage unit 322 as well as a command register 324. The data storage unit 322 is for storing displayed data received by the interface 32 and the command register 324 is to temporarily store the command received by the interface 32 and send the command to the timing generator 34. The data storage unit 322 can be a memory, a random access memory such as static random access memory or dynamic random access memory. In accordance with the command from the command register 324, the timing generator 34 generates a driving timing signal, a data timing signal and a scan timing signal, respectively sent to the light-source driving circuit 41, the data storage unit 322 and the scan driving circuit 40. The light-source driving circuit 41 generates a plurality of driving signals according to the driving timing signal and sends these driving signals to the backlight module 52 of the display panel 50 so as to make the backlight module 52 generates a plurality of color backlights sequentially. The color backlights includes a red backlight, a green backlight, and a blue backlight or some other backlight of other colors.

According to the data timing signal, data storage unit 322 sends the stored display data to the data driving circuit 38 for generating a data signal. That means the data driving circuit 38 generates a data signal according to the received display data. The data driving circuit 38 also sends the data signal to the display module 54 of the display panel 50. As to the scan driving circuit 40, it generates a scan signal according to the scan timing signal and sends the scan signal to the display module 54 of the display panel 50. Thus the display module 54 displays a frame according to the scan signal, the data signal and these color backlights. The display panel 50 of the color sequential LCD displays frames according to the scan signal, the data signal and the color backlights sequentially generated by the backlight module 52. As to the display module 54, it controls rotation angle of liquid crystal therein according to scan signal level and data signal level so as to determine light transmittance of the color backlights and further display the frames. Furthermore, the timing generator 34 adjusts pulse width of the driving timing signal and the scan timing signal in accordance with colors of different frames so as to adjust time of the scan driving circuit 40 to generate scan signals. The timing generator 34 also controls the light-source driving circuit 41 to adjust pulse width of driving signals for further adjustment of time of the backlight module 52 to generate color backlights.

Refer back to FIG. 2, the control IC 30 of the color sequential LCD according to the present invention further includes an oscillator 42, a clock generator 44 and a power supply circuit 46. The oscillator 42 keeps generating oscillation signals sent to the clock generator 44 and the power supply circuit 46. Thus the clock generator 44 generates a clock signal which is sent to the timing generator 34. According to the clock signal and a command received, the timing generator 34 generates a data timing signal, a scan timing signal, and a driving timing signal, respectively sent to the data storage unit 322, the scan driving circuit 40, and the light-source driving circuit 41. After receiving the data timing signal, the data storage unit 322 sends the stored display data to the data driving circuit 38 for generating a data signal while the scan driving circuit 40 receives the scan timing signal so as to output the scan signal. Moreover, the light-source driving circuit 41 generates a plurality of driving signals according to the driving timing signal so as to drive the backlight module 52 to generate a plurality of color backlights. Thus the display panel 50 shows the frames according to the data signals, scan signals and the color backlights.

As to the power supply circuit 46, it includes a charge pump 462 and a follower circuit 464. According to the oscillation signal, the charge pump 462 generates a first high-voltage power supply for providing the follower circuit 464 and the light-source driving circuit 41 electrical power. According to the first power supply from the charge pump 462, the follower circuit 464 generates a second high-current power supply for providing electrical power to the data driving circuit 38 and the scan driving circuit 40. In this embodiment, the light-source driving circuit 41 is disposed outside the control IC 30 so that the light-source driving circuit 41 can also be powered by an external power supply. Due to integration of the interface 32, the timing generator 34, the data driving circuit 38, the scan driving circuit 40, the oscillator 42, the clock generator 44 and the power supply circuit 46 into the control IC 30, the occupied area is decreased so that the cost is also reduced.

The microprocessor 60 only needs to send commands to the control IC 30. The matching of timing of the scan driving circuit 40 with timing of the light-source driving circuit 41 is controlled by the scan timing signal and the driving timing signal generated by the timing generator 34. Thus the microprocessor 60 will not calculate to generate timing signals for control of the scan driving circuit 40 and the light-source driving circuit 41. Therefore, the load of the microprocessor 60 is reduced and it can control the electronic device with the color sequential LCD precisely and the electronic device can run smoothly. Moreover, there is no need to add control pins on the microprocessor 60 so that the cost will not be raised. Furthermore, by the timing generator 34 that controls the light-source driving circuit 41 to generate timing of the driving signals and controls the scan driving circuit 40 to generate timing of the scan signals, the scan signals can precisely match color backlights generated from the backlight module 52 so that quality of frames displayed on the display panel 50 is further improved. In addition, due to the simple power supply circuit 46 integrated in the control IC 30, it can provide electrical power to the data driving circuit 38, the scan driving circuit 40 and the light-source driving circuit 41. There is no need to dispose an external power IC that costs much higher. Thus the cost is reduced.

Figure 3:
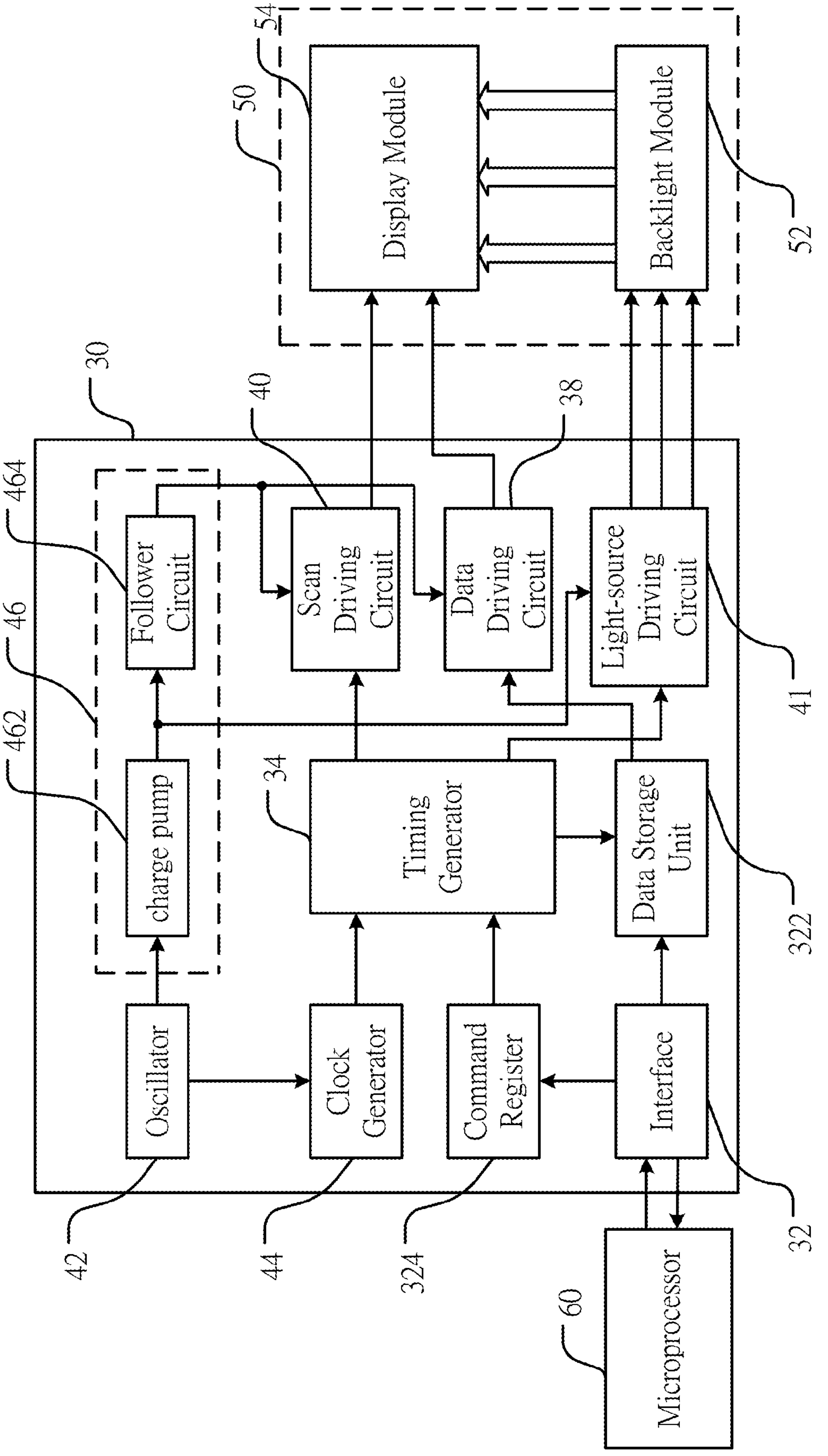
FIG. 3 is a block diagram of another embodiment of a control IC according to the present invention.

Refer to FIG. 3, a block diagram of another embodiment of a control IC according to the present invention is disclosed. The difference between this embodiment and the above one is in that the light-source driving circuit 41 is integrated into the control IC 30. Thus the area occupied by the circuit is effectively reduced and this is in favor of minimization of the electronic device.

In summary, a control IC for color sequential LCD according to the present invention integrates a timing generator therein for precise timing control of the scan driver circuit, the data driving circuit and the light-source driving circuit and reduction of loading of the microprocessor. Moreover, the light-source driver circuit, the scan driver circuit, and the data driving circuit of the control IC is powered by the power supply circuit so that the total cost of the whole circuit is reduced.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A control integrated circuit (IC) for color sequential liquid crystal displays comprising:

an interface coupled to a microprocessor for receiving a command and at least one display data from the microprocessor;

a timing generator generating a scan timing signal, a data timing signal, and a driving timing signal;

a scan driving circuit generating a scan signal according to the scan timing signal and sending the scan signal to the color sequential LCD; and a data driving circuit receiving the display data in accordance with the data timing signal to generate a data signal and sending the data signal to the color sequential LCD;

wherein the driving timing signal is sent to a light-source driving circuit so as to make the light-source driving circuit generate a plurality of driving signals that are sent to the color sequential LCD for generating a plurality of color backlights; the color sequential LCD displays a frame in accordance with the scan signal, the data signal and the plurality of color backlights.

2. The device as claimed in claim 1, wherein the control IC further comprising:

an oscillator generating an oscillation signal; and a clock generator generating a clock signal according to the oscillation signal and sending the clock signal to the timing generator so that the timing generator generates the scan timing signal, the data timing signal, and the driving timing signal according to the clock signal and the command.

3. The device as claimed in claim 1, wherein the control IC further comprising:

a power supply circuit generating a first power supply and a second power supply respectively sent to the light-source driver circuit, the scan driving circuit and the data driver circuit.

4. The device as claimed in claim 3, wherein the control IC further comprising:

an oscillator generating an oscillation signal and sending the oscillation signal to the power supply circuit so that the power supply circuit generates the first power supply and the second power supply according to the oscillation signal.

5. The device as claimed in claim 3, wherein the power supply circuit comprising:

a charge pump generating the first power supply that is sent to the light-source driver circuit.

6. The device as claimed in claim 5, wherein the power supply circuit further comprising:

a follower circuit receiving the first power supply, generating the second power supply according to the first power supply, and sending the second power supply to the scan driving circuit and the data driver circuit.

7. The device as claimed in claim 1, wherein the control IC further comprising:

a data storage unit coupled to the interface for storing the display data and sending the display data to the data driving circuit according to the data timing signal.

8. The device as claimed in claim 7, wherein the data storage unit is a memory.

9. The device as claimed in claim 8, wherein the memory is a random access memory.

10. The device as claimed in claim 1, wherein the control IC further comprising:

a command register coupled to the interface, temporarily storing the command and sending the command to the timing generator.

11. The device as claimed in claim 1, wherein the color sequential liquid crystal display further comprising:

a backlight module generating different color backlights according to the driving signals; and a display module displaying the frame according to the scan signal, the data signal and the color backlights.

12. The device as claimed in claim 1, wherein the color backlights comprises a red backlight, a green backlight and a blue backlight.

13. A control integrated circuit (IC) for color sequential liquid crystal displays comprising:

an interface coupled to a microprocessor for receiving a command and at least one display data from the microprocessor;

a timing generator generating a scan timing signal, a data timing signal, and a driving timing signal;

a scan driving circuit generating a scan signal according to the scan timing signal and sending the scan signal to the color sequential LCD;

a data driving circuit receiving the display data in accordance with the data timing signal to generate a data signal and sending the data signal to the color sequential LCD; and a light-source driving circuit generating a plurality of driving signals according to the driving timing signal and sending the driving signals to the color sequential LCD for generating a plurality of color backlights;

wherein the color sequential LCD displays a frame in accordance with the scan signal, the data signal and the plurality of color backlights.

14. The device as claimed in claim 13, wherein the control IC further comprising:

an oscillator generating an oscillation signal; and a clock generator generating a clock signal according to the oscillation signal and sending the clock signal to the timing generator so that that timing generator generates the scan timing signal, the data timing signal, and the driving timing signal according to the clock signal and the command.

15. The device as claimed in claim 13, wherein the control IC further comprising:

a power supply circuit generating a first power supply and a second power supply respectively sent to the light-source driver circuit, the scan driving circuit and the data driver circuit.

16. The device as claimed in claim 15, wherein the control IC further comprising:

an oscillator generating an oscillation signal and sending the oscillation signal to the power supply circuit so that the power supply circuit generates the first power supply and the second power supply according to the oscillation signal.

17. The device as claimed in claim 15, wherein the power supply circuit comprising:

a charge pump generating the first power supply that is sent to the light-source driver circuit.

18. The device as claimed in claim 17, wherein the power supply circuit further comprising:

a follower circuit receiving the first power supply, generating the second power supply according to the first power supply, and sending the second power supply to the scan driving circuit and the data driving circuit.

19. The device as claimed in claim 13, wherein the control IC further comprising:

a data storage unit coupled to the interface for storing the display data and sending the display data to the data driving circuit according to the data timing signal.

20. The device as claimed in claim 19, wherein the data storage unit is a memory.

21. The device as claimed in claim 20, wherein the memory is a random access memory.

22. The device as claimed in claim 13, wherein the control IC further comprising:

a command register coupled to the interface, temporarily storing the command and sending the command to the timing generator.

23. The device as claimed in claim 13, wherein the color sequential liquid crystal display further comprising:

a backlight module generating the color backlights according to the driving signals; and a display module displaying the frame according to the scan signal, the data signal and the color backlights.

24. The device as claimed in claim 13, wherein the color backlights comprises a red backlight, a green backlight and a blue backlight.

* * * * *